(12) United States Patent
Sakaguchi

(10) Patent No.: US 10,578,153 B2
(45) Date of Patent: Mar. 3, 2020

(54) MULTI-ROW BALL BEARING

(71) Applicant: NSK LTD., Tokyo (JP)

(72) Inventor: Yuki Sakaguchi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/775,719

(22) PCT Filed: Nov. 11, 2016

(86) PCT No.: PCT/JP2016/083602
§ 371 (c)(1),
(2) Date: May 11, 2018

(87) PCT Pub. No.: WO2017/082421
PCT Pub. Date: May 18, 2017

(65) Prior Publication Data
US 2018/0328405 A1    Nov. 15, 2018

(30) Foreign Application Priority Data

Nov. 13, 2015 (JP) .................................. 2015-223210
Mar. 1, 2016 (JP) .................................. 2016-038899

(51) Int. Cl.
F16C 19/18    (2006.01)
F16C 33/60    (2006.01)
F16C 19/10    (2006.01)
F16C 19/16    (2006.01)
F16C 33/58    (2006.01)

(52) U.S. Cl.
CPC .............. *F16C 19/18* (2013.01); *F16C 19/10* (2013.01); *F16C 19/166* (2013.01); *F16C 19/181* (2013.01); *F16C 33/585* (2013.01); *F16C 33/60* (2013.01); *F16C 2240/54* (2013.01); *F16C 2240/70* (2013.01); *F16C 2352/00* (2013.01)

(58) Field of Classification Search
CPC .............................. F16C 19/18; F16C 19/166
See application file for complete search history.

(56) References Cited

U.S. PATENT DOCUMENTS 4,501,454 A  *  2/1985  Dennis .................... E21B 4/003
                                                        384/619
5,086,851 A     2/1992  Beasley
                (Continued)

FOREIGN PATENT DOCUMENTS

JP      34-2868 Y1    3/1959
JP      4-262120 A    9/1992
(Continued)

OTHER PUBLICATIONS

Machine Translation of JPO2015017661.*
(Continued)

*Primary Examiner* — Thomas R Hannon
(74) *Attorney, Agent, or Firm* — Sughrue Mion, PLLC

(57) ABSTRACT

Provided is a multi-row ball bearing that includes an outer ring, an inner ring, and two or more rows of balls retained by raceway surfaces of the outer and inner rings. Each of the raceway surfaces is formed as a Gothic arch groove, and the outer and inner rings are division races that are divided on at least one of the raceway 5 surfaces at a middle position of the raceway surface.

14 Claims, 10 Drawing Sheets

(56) References Cited

U.S. PATENT DOCUMENTS

| | | | | |
|---|---|---|---|---|
| 5,228,353 | A | * | 7/1993 | Katahira ............ F16H 25/2018 384/43 |
| 5,248,204 | A | * | 9/1993 | Livingston ............. E21B 4/003 175/107 |
| 6,010,420 | A | * | 1/2000 | Niki ....................... F02B 67/06 384/475 |
| 6,116,786 | A | * | 9/2000 | Takata ................. F16C 19/166 384/450 |
| 6,309,109 | B1 | | 10/2001 | Chuang |
| 7,008,113 | B2 | * | 3/2006 | Herles .................... F16C 19/20 384/192 |
| 9,360,043 | B2 | * | 6/2016 | Frank .................... F16C 33/585 |
| 10,197,100 | B2 | * | 2/2019 | Scharting ................ F16C 39/02 |
| 2007/0151634 | A1 | | 7/2007 | Fujita |
| 2014/0363115 | A1 | | 12/2014 | Yamada et al. |
| 2017/0108042 | A1 | * | 4/2017 | Pierce .................... F16C 33/32 |
| 2018/0187491 | A1 | * | 7/2018 | Brand .................... E21B 4/003 |

FOREIGN PATENT DOCUMENTS

| | | | |
|---|---|---|---|
| JP | 9-273546 A | 10/1997 | |
| JP | 2001-165156 A | 6/2001 | |
| JP | 2004-308770 A | 11/2004 | |
| JP | 2005214330 A * | 8/2005 | ............ F16C 19/166 |
| JP | 2015-017661 A | 1/2015 | |
| WO | 2005/068675 A1 | 7/2005 | |
| WO | 2013/084800 A1 | 6/2013 | |

OTHER PUBLICATIONS

Machine Translation of JP 2005-214330.*

Search Report dated Feb. 7, 2017, issued by the International Searching Authority in International Application No. PCT/JP2016/083602 (PCT/ISA/210).

Written Opinion dated Feb. 7, 2017, issued by the International Searching Authority in International Application No. PCT/JP2016/083602 (PCT/ISA/237).

* cited by examiner

MULTI-ROW BALL BEARING

TECHNICAL FIELD

The present invention relates to a multi-row ball bearing formed by providing a plurality of unit ball bearings in rows.

BACKGROUND ART

Shale gas and shale oil that have recently attracted attention as new energies are present in a shale layer located deep under the ground at a depth of thousands of meters, and a drilling rig having a drill part 100 as illustrated in FIG. 10 is used in drilling work to extract the shale gas and the shale oil. This drill part 100 includes a drill bit 110 at a tip thereof (close to the shale layer), and is configured to rotate the drill bit 110 via a hollow drill string (not shown) coupled to an upper end of the drill bit 110 using a ground motor (not shown).

A high axial load in an axial direction of a drill occurs at the drill bit 110 when an underground hard bedrock is drilled, and a high axial load caused by a dead load of the drill string is further applied to the drill bit 110. For this reason, a bearing 120 that supports the drill bit 110 does not only require a high load capacity, but also should function to receive an axial load applied in a vertical direction. Since there is no space for structurally holding a lubricant in the bearing on the periphery of the bearing 120, since there is also no function to supply oil or grease in the middle of drilling, and since a surrounding environment unusually becomes a high temperature because it is used under the ground at a depth of thousands of meters, there is a fear that lubrication constantly becomes poor. Since muddy water easily invades into the bearing, there is a possibility of the bearing being damaged in its early stage by water and foreign materials, and the bearing 120 is under a very harsh use environment.

A multi-row ball bearing illustrated in, for instance, Patent Document 1 is used as the bearing 120 for supporting this drill bit 110. In the multi-row ball bearing, numerous inner ring raceway surfaces are formed by making an inner ring wider, and numerous outer rings are arranged to cause outer ring raceway surfaces thereof to face the inner ring raceway surfaces provided on the inner ring. Two sets of multi-row ball bearings are used, one of which receives the axial load from the tip of the drill bit 110, and the other of which supports the dead load of the drill string. To this end, the multi-row ball bearings are disposed to cause directions of contact angles to face each other.

However, since the inner ring is formed in an integrated type in which the multi-row inner ring raceway surface is formed, axial load is uniformly received in each row. To this end, the accuracy of a component should be secured to some extent, and grooves should be accurately machined. In the drill part 100, since the bearing 120 is frequently disassembled, inspected and replaced for maintenance, it is difficult to inspect the bearing 120 like the integrated inner ring. If the bearing 120 is damaged and replaced, the entire bearing 120 should be replaced, and maintenance costs are also increased. Further, specifications considering a high axial load, a high-temperature environment, poor lubrication are not also mentioned.

RELATED ART REFERENCE

Patent Document

Patent Document 1: JP-A-H04-262120

SUMMARY OF THE INVENTION

Problems to be Solved by the Invention

The present invention was made to resolve the above problems, and is directed to providing a multi-row ball bearing that has load resistant performance capable of sufficiently resisting a high load applied along an axis in two vertical directions, further has sufficient durability even in a harsh environment which is exposed to a high temperature and muddy water and in which lubrication constantly becomes poor, and facilitates maintenance.

Means for Solving the Problems

To solve the problem, the present invention provides a multi-row ball bearing below.

(1) A multi-row ball bearing including an outer ring, an inner ring, and two or more rows of balls retained by raceway surfaces of the outer and inner rings, wherein:

each of the raceway surfaces is formed as a Gothic arch groove; and the outer and inner rings are division races that are divided on at least one of the raceway surfaces at a middle position of the raceway surface.

(2) The multi-row ball bearing according to (1) above, wherein each of the balls and the raceway surfaces are in contact at four points.

(3) A multi-row ball bearing including an outer ring having two or more rows of raceway surfaces, an inner ring having two or more rows of raceway surfaces, and two or more rows of balls retained by the raceway surfaces of the outer and inner rings, wherein:

each of the raceway surfaces is formed as a Gothic arch groove;

each of the balls and the raceway surfaces are in contact at four points; and the outer and inner rings are division races that are divided on at least one of the raceway surfaces at a middle position of the raceway surface.

(4) The multi-row ball bearing according to any one of (1) to (3) above, wherein the multi-row ball bearing is a full type ball bearing without a retainer.

(5) The multi-row ball bearing according to any one of (1) to (4) above, wherein the outer and inner rings are formed of alloy steel that uses Fe as a parent material and contains 0.3 to 0.7 mass % C, 0.2 to 1.2 mass % Si, 0.2 to 1.7 mass % Mn, 0.2 to 1.3 mass % Cr, 0.1 to 0.3 mass % Mo, and 0.1 to 1.0 mass % Ni, an amount of residual austenite of the raceway surface is 25 to 45 vol %, and a concentration of (C+N) is 0.75 to 1.1 mass %.

(6) The multi-row ball bearing according to any one of (1) to (5) above, wherein hardness of the raceway surfaces of the outer and inner rings is HRC60 to HRC65, and a difference between the hardness of the raceway surface and a core part is within ±HRC5.

(7) The multi-row ball bearing according to any one of (1) to (6) above, wherein the balls are formed of alloy steel that uses Fe as a parent material and contains 0.3 to 0.7 mass % C, 0.2 to 1.0 mass % Mn, 0.2 to 1.2 mass % Si, 0.1 to 0.3 mass % Mo, and 0.1 to 1.0 mass % V.

(8) The multi-row ball bearing according to any one of (1) to (7) above, wherein surface hardness of the ball is HRC55 to 60.

(9) The multi-row ball bearing according to any one of (1) to (8) above, wherein, when a diameter of the ball is defined as Dw, and radii of race grooves of the outer and inner rings are defined as Re and Ri, the multi-row ball bearing has a relation of $0.54 \leq Re/Dw$ and a relation of $Ri/Dw \leq 0.75$.

(10) The multi-row ball bearing according to any one of (1) to (9) above, wherein, when a diameter of the ball is defined as Dw, and a height of a cross section of the bearing is defined as H, the multi-row ball bearing has a relation of $0.55 \leq Dw/H \leq 0.75$.

(11) The multi-row ball bearing according to any one of (1) to (10) above, wherein, when roughness of the raceway surfaces of the outer and inner rings is defined as Se and Si, and surface roughness of the ball is defined as Sb, the multi-row ball bearing has a relation of 0.05 µm Ra≤Se, a relation of Si≤0.60 µm Ra, a relation of 0.005 µm Ra≤Sb≤0.100 µm Ra, and a relation of Se and Si≥Sb.

(12) The multi-row ball bearing according to any one of (1) to (11) above, wherein, when a height of a cross section of the bearing is defined as H, a height of a cross section of the outer ring is defined as A, and a height of a cross section of the inner ring is defined as B, the multi-row ball bearing satisfies a relation of $0.20 \leq A/H < 0.50$ and a relation of $0.20 \leq B/H < 0.50$.

(13) The multi-row ball bearing according to (12), wherein, when the height of the cross section of the outer ring is defined as A, and the height of the cross section of the inner ring is defined as B, the multi-row ball bearing satisfies a relation of A<B or a relation of A>B.

(14) The multi-row ball bearing according to any one of (1) to (13), wherein the multi-row ball bearing is an open type bearing in which muddy water flows through an inside of the bearing.

(15) The multi-row ball bearing according to any one of (1) to (14), wherein the multi-row ball bearing is used in a drill for a drilling rig, a mud motor, or a downhole motor.

Advantages of the Invention

The multi-row ball bearing of the present invention has high load resistant performance capable of sufficiently resisting a high load even when raceway surfaces of outer and inner rings are formed as Gothic arch grooves and the high load is applied along an axis in two directions. Since the outer and inner rings are division races in a multi-row structure in which bearing units are provided in rows, working accuracy of the individual bearing units can be increased. Since it is sufficient to replace only damaged or broken bearing units or individually replace inner and outer rings and balls that are damaged or broken, the multi-row ball bearing is also excellent in maintenance characteristic.

MODES FOR CARRYING OUT THE INVENTION

Hereinafter, the present invention will be described in detail with reference to the drawings.

Figure 1:
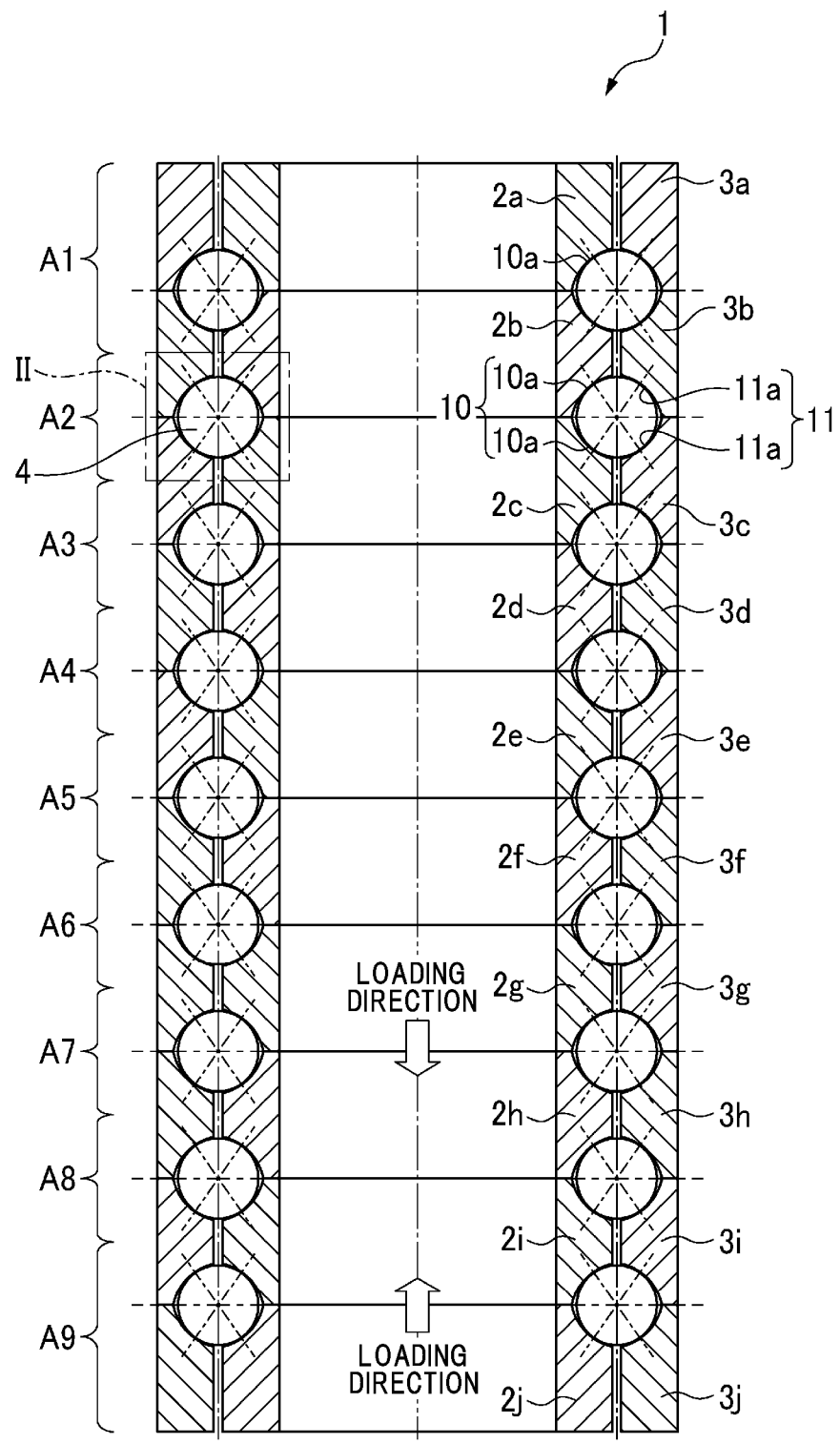
FIG. 1 is a sectional view illustrating a multi-row ball bearing of the present invention.

FIG. 1 is a sectional view illustrating an embodiment of a multi-row ball bearing (hereinafter referred to as "present bearing") of the present invention. The present bearing 1 is a thrust ball bearing, and is configured to provide a plurality of inner rings 2a to 2j (ten inner rings 2a to 2j in the example of the figure) and a plurality of outer rings 3a to 3j (ten outer rings 3a to 3j in the example of the figure) in rows by bringing end faces of the inner and outer rings into contact with each other. In the inner rings (for example, 2b and 2c) adjacent to each other, one inner ring raceway surface 10 centered on contact surfaces of the opposite inner rings is formed. In the outer rings (for example, 3b and 3c) adjacent to each other, one outer ring raceway surface 11 centered on contact surfaces of the opposite outer rings is formed. A ball 4 is retained by both the raceway surfaces 10 and 11. That is, each of a pair of inner rings adjacent to each other and a pair of outer rings adjacent to each other forms one raceway surface, and a plurality of bearing units A1, A2 . . . , each of which retains the ball 4, are provided in rows, and thereby the multi-row ball bearing is formed. When the present bearing 1 is an open type bearing without a seal member and is applied as a bearing supporting a drill bit, muddy water passes through the inside of the bearing.

In the following description, the inner rings 2a to 2j and the outer rings 3a to 3j are also expressed as races 2 and 3.

The inner ring 2a (2j) located at each end has a half 10a of the inner ring raceway surface 10 which is formed only near the inner ring 2b (2i) located on an inner side thereof, and the outer ring 3a (3j) located at each end has a half 11a of the outer ring raceway surface 11 which is formed only near the outer ring 3b (3i) located on an inner side thereof. The half of the raceway surface refers to a half of a cross section shape of the raceway surface.

The other inner rings 2b to 2i and the other outer rings 3b to 3i all have the same shape, are formed with the halves 10a of the inner ring raceway surfaces 10 and the halves 11a of the outer ring raceway surfaces 11 at both shoulders thereof, and include so-called "multi-row races." That is, the inner rings 2b to 2i and the outer rings 3b to 3i have first raceway surfaces 10a1 and 11a1 on one side (a drill bit side) of the middle position in an axial direction, and second raceway surfaces 10a2 and 11a2 on the other side (a drill string side) of the middle position in the axial direction.

The balls 4 may be used for a full type ball bearing in which no retainer is used to increase a load capacity of the bearing by increasing the number of balls as many as possible. According to use conditions or lubricating conditions, the retainer may be used. A material of the retainer includes an iron-based material, a brass-based material, a plastic material, but a type thereof does not matter.

Figure 2:
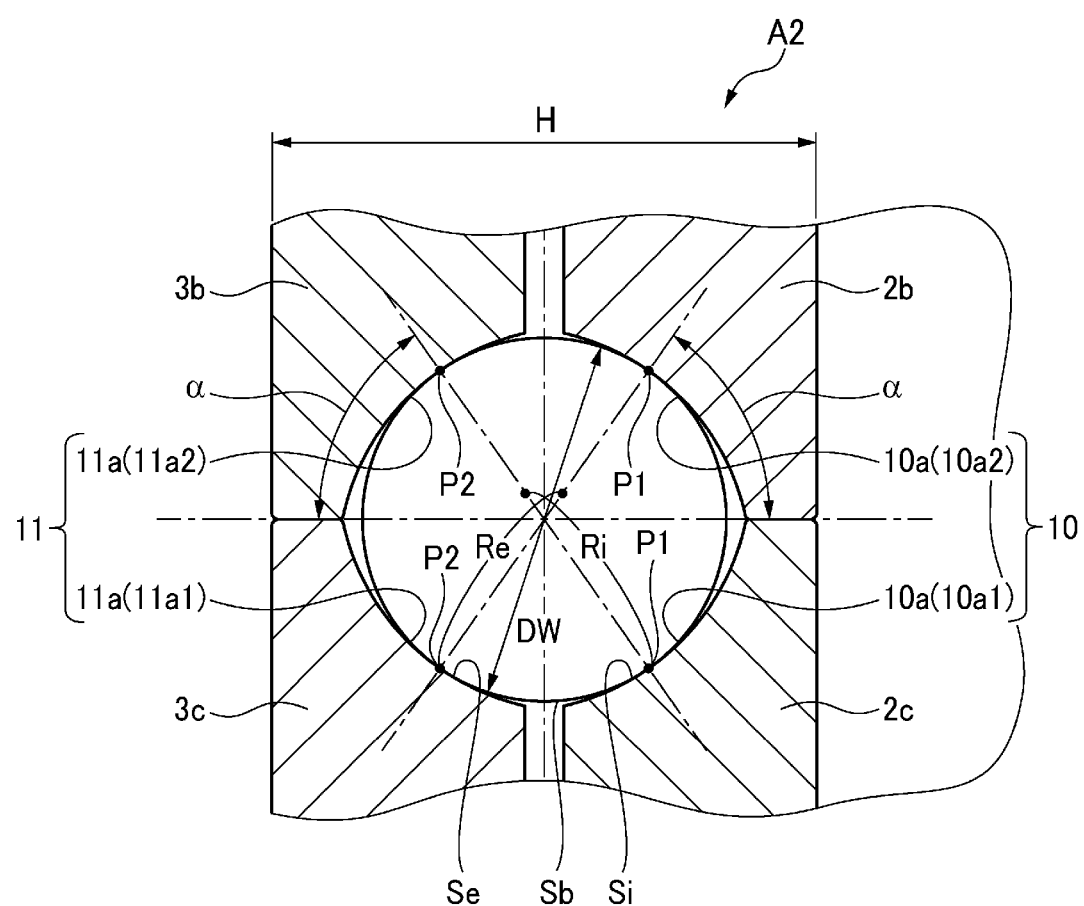
FIG. 2 is an enlarged sectional view of a part II for illustrating a cross-sectional shape of raceway surfaces of the multi-row ball bearing of the present invention and a state in which the raceway surfaces are in contact with a ball.
Figure 3:
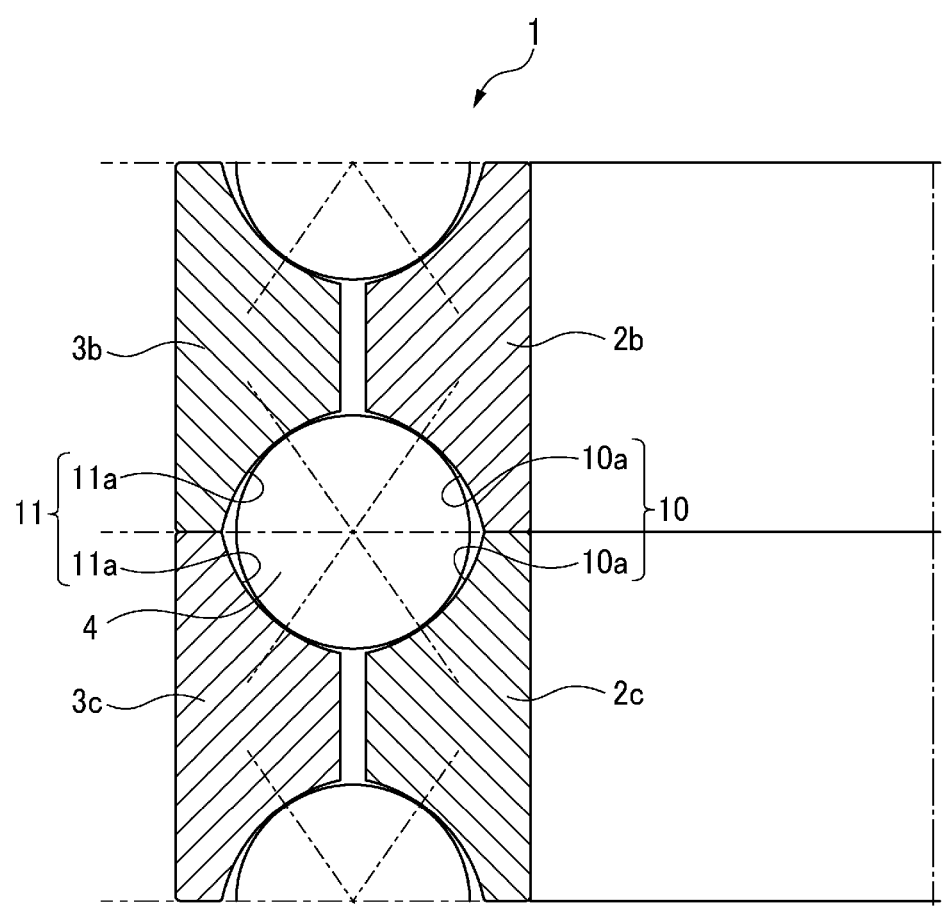
FIG. 3 is a sectional view of key parts of the multi-row ball bearing of FIG. 1.

In the present bearing 1, the inner ring raceway surface 10 and the outer ring raceway surface 11 have a cross section shape illustrated in FIG. 2 to come into contact with the ball 4 at four points. FIG. 2 illustrates the bearing unit A2 extracted from FIG. 1, and is illustrated by dividing a pair of inner rings 2b and 2c and a pair of outer rings 3b and 3c into two parts in width directions thereof. FIG. 3 illustrates the entire width directions of the pair of inner rings 2b and 2c and the pair of outer rings 3b and 3c.

The half 10a of the inner ring raceway surface 10 and the half 11a of the outer ring raceway surface 11 are both formed at a radius of curvature larger than that of the ball 4, and the cross section shapes of the inner ring raceway surface 10 and the outer ring raceway surface 11 that are formed by providing both of the inner rings 2b and 2c and both of the outer rings 3b and 3c in rows have so-called Gothic arch shapes. The ball 4 and the inner ring raceway surface 10 come into contact with each other at two points P1, and the ball 4 and the outer ring raceway surface 11 come into contact with each other at two points P2, so that the ball 4 and the inner and outer ring raceway surfaces 10 and 11 are in contact at four points. Since the cross section shapes of the inner ring raceway surface 10 and the outer ring raceway surface 11 are the Gothic arch shapes, the inner ring raceway surface 10 and the outer ring raceway surface 11 can receive radial loads from opposite directions in the axial direction. Further, in the present bearing 1, radii of curvature of the halves 10a and 10a of the inner ring raceway surface are equally set. A contact angle $\alpha$ is maintained between the inner rings 2b and 2c and the ball 4 and between the outer rings 3b and 3c and the ball 4.

Since the ball 4 has a clearance to some extent, if the bearing unit A8 constituted of, for example, the second and third inner rings 2i and 2h and the second and third outer rings 3i and 3h from below in FIG. 1 is given as an example, when an axial load is applied to the inner rings of this bearing unit from above to below, the ball 4 can be subjected to the load at a contact angle $\alpha$ by the outer ring 3i and the inner ring 2h. In contrast, when an axial load is applied from below to above, the ball 4 can be subjected to the load at a contact angle $\alpha$ by the outer ring 3h and the inner ring 2i. In this way, the ball 4 can be subjected to the axial load in a vertical direction by a pair of inner rings and a pair of outer rings of the bearing unit.

An initial contact angle, that is, a contact angle $\alpha$ in a state in which no load is applied, is preferably no less than 40° in order to increase an allowable axial load, and more preferably no less than 45°. It is not good for the contact angle $\alpha$ to increase without limitation, and the upper limit of the contact angle $\alpha$ is preferably set to no more than 75° because working becomes difficult.

In FIG. 1, the number of unit ball bearings is set to ten. However, the number of unit ball bearings may be increased when the axial load is great, and may be reversely reduced when there is no problem with a space or the axial load is not so great.

That is, the number of unit ball bearings can be appropriately increased or reduced. For example, in the configuration of the multi-row ball bearing of the present invention, when the unit ball bearings is used for a mining machine drill, a mud motor, or a downhole motor to apply a predetermined axial load, five or more rows of unit ball bearings or five or more unit ball bearings may be adopted, that is, five rows or five or more rows of outer ring raceway surfaces, inner ring raceway surfaces, and balls may be adopted.

In the present bearing 1, as illustrated in FIG. 2, when a diameter of the ball is defined as Dw, a radius of the inner ring raceway surface (the inner ring raceway groove) 10 for the inner ring 2a to 2j is defined as Ri, and a radius of the outer ring raceway surface (the outer ring raceway groove) 11 for the outer ring 3a to 3j is defined as Re, the present bearing 1 preferably has a relation of $0.54 \leq Re/Dw$ and a relation of $Ri/Dw \leq 0.75$. Since the present bearing 1 has a structure into which muddy water easily invades from a surrounding environment, a large quantity of foreign materials easily enter between the raceway surfaces 10 and 11 of the races 2 and 3 and rolling surfaces of the balls 4, the present bearing 1 is put in a situation in which friction caused by the foreign materials progresses easily. In the present embodiment, when $0.54 \leq Re/Dw$ and $Ri/Dw$, an embracement ratio of the races 2 and 3 to the balls 4 (a radius of curvature of the rolling surface of the ball/a radius of curvature of the raceway surface of the race) is reduced, and thus the foreign materials can be easily discharged to the outside even when they enter. As a result, wear of the raceway surfaces 10 and 11 of the races 2 and 3 or the rolling surfaces of the balls 4 can be suppressed. Meanwhile, when the embracement ratio of the races 2 and 3 is excessively increased, contact surface pressures of the balls 4 are excessively increased, and a reduction in lifespan is reversely incurred. Thus, the upper limits of Re/Dw and Ri/Dw are set to 0.75. In the present embodiment, to prevent damage to a wear reducing effect and suppress an excessive contact surface pressure, the radii Re and Ri of the raceway surfaces 10 and 11 are preferably set to $0.60 \leq Re/Dw$ and $Ri/Dw \leq 0.70$.

In the present embodiment, when the diameter of the ball is defined as Dw, and a height of a cross section of the bearing is defined as H, a relation between Dw and H has a relation of $0.55 \leq Dw/H \leq 0.75$. When the drill bit drills underground hard bedrock, a high axial load occurs in an axial direction of the drill. Since the drill bit and the ground motor are connected, a high axial load caused by the dead load of the drill string also occurs, and the present bearing 1 for supporting the drill bit requires a load capacity as high as possible. If Dw/H is set to the above range, the diameter Dw of the ball is increased, so that the load capacity can be increased. On the other hand, when the diameter Dw of the ball is excessively increased, wall thicknesses of the inner rings 2a to 2j and the outer rings 3a to 3j are excessively thinned, so that necessary rigidity cannot be secured, and working of the inner rings 2a to 2j and the outer rings 3a to 3j becomes difficult. For this reason, the upper limit of Dw/H is set to 0.75. To prevent damage to necessary load capacity and secure the rigidities of the inner rings 2a to 2j and the outer rings 3a to 3j, the diameter Dw of the ball is preferably $0.57 \leq Dw/H \leq 0.72$.

The aforementioned embodiment has a shape in which the balls are retained by a plurality of division races divided at the middle position of any raceway surface, and has a structure in which the individual balls are easily replaced. However, the multi-row ball bearing of the present invention is not limited to the aforementioned structure, and may adopt, for instance, a structure in which the inner ring and the outer ring combine the division races divided on at least one raceway surface at the middle position of the raceway surface. In this case, the ball can be replaced for each division race. Further, in the present embodiment, each of the inner ring and the outer ring is divided on at least one raceway surface at the middle position of the raceway surface, but it is not preferably divided at a portion other than the raceway surface. This structure does not simply use a single row thrust ball bearing in multiple rows side by side, arranges the balls of each row at a division position of the race thereof, and thus hardly causes misalignment of the race. For this reason, when the bearing is assembled to the drill, trouble that the race and the balls are misaligned, disassembled, and not assembled can be prevented. Accordingly, the multi-row ball bearing of the present invention is not subjected to oil lubrication, and is also suitable under the harsh use environment under which the muddy water and the foreign materials constantly pass through the inside of the bearing.

Further, the inner rings 2a and 2j and the outer rings 3a and 3j at the opposite ends are set to be the same as the other inner rings 2b to 2i and the other outer rings 3b to 3i, and the balls 4 cannot also be arranged in the half 10a of the inner ring raceway surface 10 and the half 11a of the outer ring raceway surface 11 which are located on the outermost side. In this case, the inner ring and the outer ring result in one type, and costs can be reduced due to a reduction in the number of components.

First Embodiment

Figure 4:
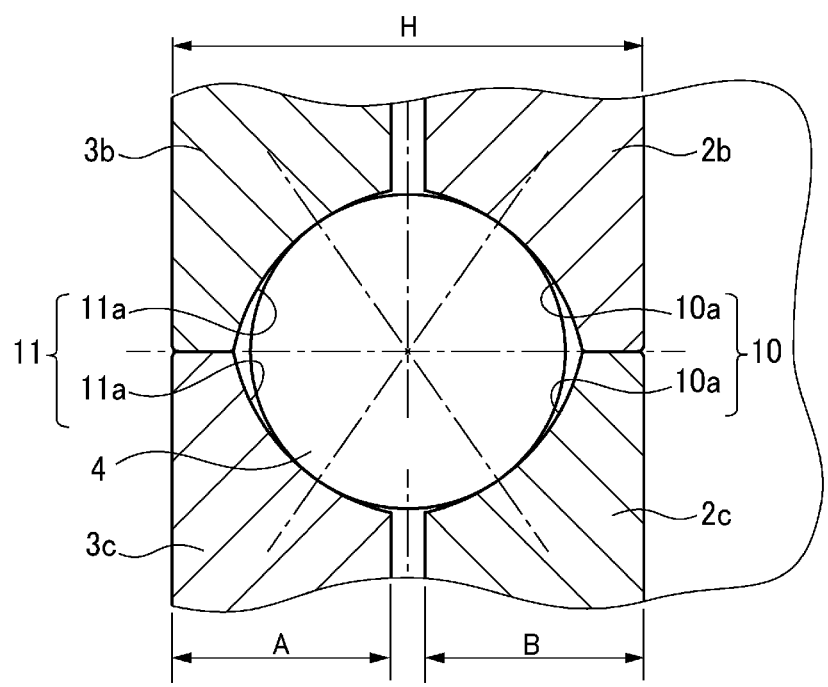
FIG. 4 is a view that is for illustrating a relation between a height of a cross section of a multi-row ball bearing according to a first embodiment of the present invention and heights of cross sections of inner and outer rings and is equivalent to FIG. 2.

In the present embodiment, as illustrated in FIG. 4, when the height of the cross section of the bearing is defined as H, a height of the cross section of the outer ring is defined as A, and a height of the cross section of the inner ring is defined as B, the bearing is designed to satisfy a relation of 0.20≤A/H<0.50 and a relation of 0.20≤B/H<0.50. When the drill bit drills the underground hard bedrock, the high axial load occurs in the axial direction of the drill. Since the drill bit and the ground motor are connected, the high axial load caused by the dead load of the drill string also occurs, and the present bearing 1 for supporting the drill bit requires a load capacity as high as possible.

At this point, the inner and outer ring raceway surfaces 10 and 11 and the surfaces of the balls are exposed to the poor lubrication environment in which water, mud, etc. unique to the present use conditions invade in a large quantity, and thus the balls 4 and the inner and outer ring raceway surfaces 10 and 11 are configured to be rotated in a state of little lubrication. For this reason, wear easily progresses on the raceway surfaces 10 and 11 and the surfaces of the balls.

At this time, since contact positions between the balls 4 and the raceway surfaces 10 and 11 are close in directions of groove shoulders (in the case of the inner ring 10, a direction of an outer diameter of the inner ring, and in the case of the outer ring 11, a direction of an inner diameter of the outer ring), if heights of the groove shoulders are insufficient, riding of the balls 4 onto the groove shoulders occurs. When the riding of the balls 4 occurs, riding scratches occur on the surfaces of the balls, and damage such as peeling or crack damage occurs easily with this as a starting point.

For this reason, the height A of the cross section of the outer ring and the height B of the cross section of the inner ring which correspond to the heights of the groove shoulders are regulated to the above ranges. Thereby, even when the balls 4 and the raceway surfaces 10 and 11 are greatly worn under poor lubrication unique to the present application, the occurrence of the riding of the balls 4 can be reduced. The lower limits of necessary heights of the groove shoulders are estimated from a relation between the axial load applied to the present bearing 1 and a contact ellipse generated between the balls 4 and the raceway surfaces 10 and 11 by a contact angle and a load, and the lower limits of A/H and B/H are set to 0.20. Meanwhile, when it is not good for the groove shoulders to be increased without limitation and the groove shoulders are excessively increased, there is a fear of contact with the other race, and working of the inner ring 2 and the outer ring 3 becomes difficult. Thus, the upper limits are set to 0.50. That is, a constant gap is formed between inner and outer rings 2 and 3.

Second Embodiment

Figure 5A:
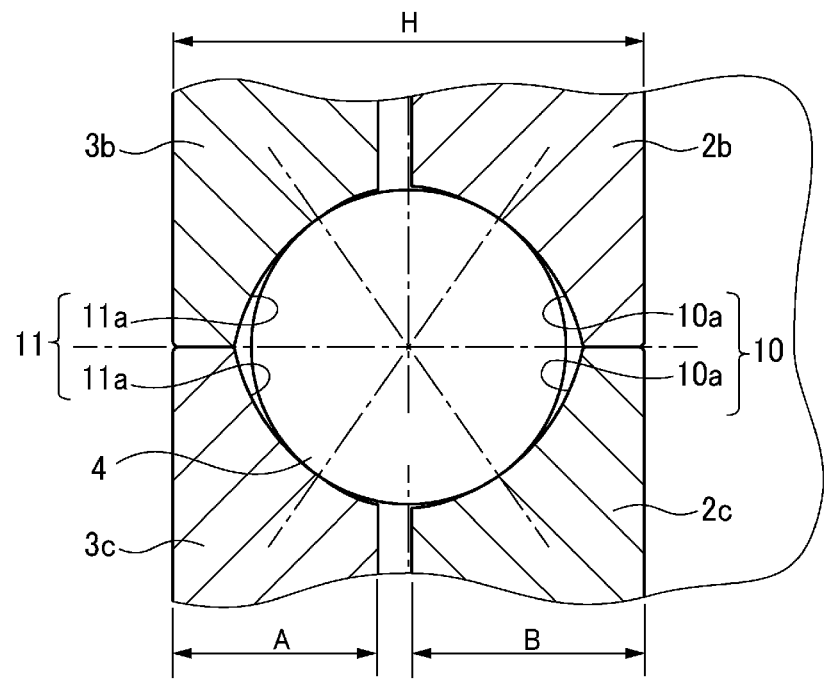
FIGS. 5A and 5B are views that are for illustrating a relation between heights of cross sections of inner and outer rings of a multi-row ball bearing according to a second embodiment of the present invention and are equivalent to FIG. 2.
Figure 5B:
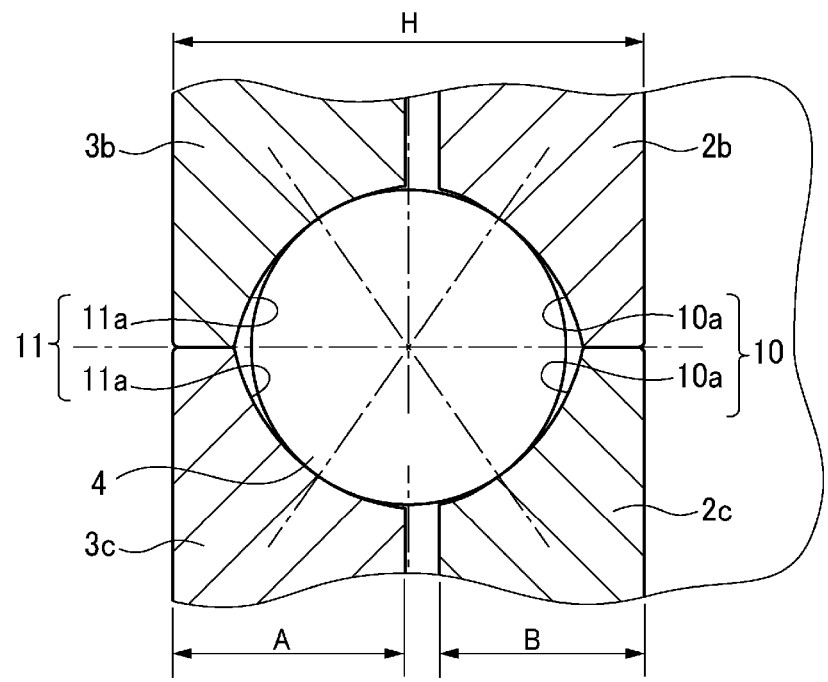

A relation between the height A of the cross section of the outer ring and the height B of the cross section of the inner ring may be set as A<B as illustrated in FIG. 5A or A>B as illustrated in FIG. 5B.

When it is supposed that wear on the side of the inner ring raceway surface 10 proceeds according to the use conditions, and a frequency at which the riding onto the groove shoulder of the inner ring 2 occurs is made higher than the outer ring 3, the relation is set as the relation of A<B, so that the occurrence of the riding of the balls 4 onto the groove shoulder of the inner ring can be suppressed.

Likewise, when it is supposed that wear on the side of the outer ring raceway surface 11 proceeds, and a frequency at which the riding onto the groove shoulder of the outer ring 2 occurs is made higher, the relation is set as the relation of A>B, so that the occurrence of the riding of the balls 4 onto the groove shoulder of the outer ring can be suppressed.

In this way, if the height A of the cross section of the outer ring and the height B of the cross section of the inner ring are regulated to the above relation, a frequency at which the riding of the balls 4 occurs can be reduced, so that the lifespan of the present bearing 1 can be made longer, and the costs of the bearing can be reduced.

In the present bearing 1, there is no limitation on materials of the inner ring, the outer ring, and the balls, but the following materials are preferably used.

The materials of the inner ring and the outer ring are preferably alloy steel in which Fe is used as a parent material, and which further contains 0.3 to 0.7 mass % C, 0.2 to 1.2 mass % Si, 0.2 to 1.7 mass % Mn, 0.2 to 1.3 mass % Cr, 0.1 to 0.3 mass % Mo, and 0.1 to 1.0 mass % Ni. Any of Si, Mn, Cr, Mo, and Ni of the alloy steel contributes to an improvement in hardenability, where Mn easily generates residual austenite, Si improves strength of a structure of a matrix, Cr gives wear resistance, Mo gives toughness, and Ni gives shock resistance. C is an element that is dissolved in the matrix by hardening and improves hardness. Accordingly, when contents of these alloy components are out of the respective ranges, an effect of each alloy component is not obtained.

In the present invention, carbonitriding treatment is preferably performed to adjust an amount of the residual austenite and a concentration of (C+N) of the raceway surface, and a difference between hardness of the raceway surface and hardness of a core part as follows. However, when C is less than 0.3 mass %, a carburizing time for obtaining desired hardness is prolonged. In addition to this, a diffusion length of carbon dissolved in the austenite becomes longer. As a result, a state in which carbon is dissolved in the austenite becomes non-uniform to create a stress concentration source, and a rolling fatigue lifespan is also reduced. However, when C is more than 0.7 mass %, an amount of carbon dissolved in the austenite is excessive. As a result, the residual austenite increases after the hardening, and surface hardness is reduced.

Si contributes to the improvement of hardenability and deoxidation at a content of 0.2 mass % or more. However, when Si is more than 1.2 mass %, a surface is deoxidized during heat treatment, ferrite is increased in the core part, and press formability, cold forgeability, and mechanical properties are reduced. If the Si content ranges from 0.2 to 1.2 mass %, a crushing value is also improved, and the Si content contributes to an improvement in the rolling fatigue lifespan.

Mn serves as a component of improving hardenability and a deoxidizer at a content of 0.2 mass % or more. However, when Mn is more than 1.7 mass %, the residual austenite increases, and machinability and hot workability of a steel material is reduced.

Cr improves hardenability, carburization, wear resistance, and mechanical properties at a content of 0.2 mass % or more. However, when Cr is more than 1.3 mass %, this leads to excessive carburization, the residual austenite increases, or a granular carbide increases, and a carburized hardened layer is embrittled.

Mo increases hardenability and gives high toughness at a content of 0.1 mass % or more. However, when Mo is more than 0.3 mass %, this leads to excessive carburization, and residual austenite of a carburized layer increases. In addition to these, to further improve hardenability, using C, Si, Mn, and Cr instead is economical.

Ni presents an effect of improving hardenability at a content of 0.1 mass % or more, and additionally improves shock resistance due to a process of homogenizing a hardened structure. However, in terms of the effect of improving hardenability, setting the Ni content to be more than 1.0 mass % is uneconomical, and using C, Si, Mn, and Cr instead is economical.

The contents of these alloy components are preferably set to 0.35 to 0.55 mass % C, 0.3 to 1.0 mass % Si, 0.5 to 1.5 mass % Mn, 0.4 to 1.1 mass % Cr, 0.15 to 0.25 mass % Mo, and 0.15 to 0.8 mass % Ni.

The inner ring and the outer ring are configured such that the carbonitriding treatment is preferably performed to adjust an amount of the residual austenite of the raceway surface to 25 to 45 vol % and a concentration of (C+N) of the raceway surface to 0.75 to 1.1 mass %. Under mixture of foreign materials, surface cracks occurring at an edge of an indentation caused by the foreign material are often widely spread to lead to an ultimate fatigue failure. If the amount of the residual austenite is 25 vol % or more, even when the indentation is present, the edge of the indentation is rounded when the ball rolls on the indentation. As a result, stress concentration is relieved, and occurrence of an edge load is suppressed. Meanwhile, when the amount of the residual austenite exceeds 45 vol %, a lifespan is reduced. The amount of the residual austenite of the raceway surface is more preferably 30 to 40 vol %.

To provide the inner ring and the outer ring with sufficient strength, there is a need to secure amounts of C and N in the parent material while dispersing a carbide, a carbonitride, and a nitride to a surface layer part in a large quantity. For this reason, when the concentration of (C+N) is less than 0.75 mass %, the dispersion of the carbide, the carbonitride, and the nitride is not sufficiently performed, and the strength of the parent material also becomes insufficient. When the concentration of (C+N) exceeds 1.1 mass %, large carbide is formed in the surface layer part, stress is concentrated on a boundary with the parent material, and the rolling fatigue lifespan is reduced. The concentration of (C+N) is more preferably 0.80 to 1.05 mass %.

Further, it is preferred that the hardness of the raceway surfaces of the inner ring and the outer ring is set to HRC60 to HRC65, and that the difference between the hardness of the raceway surface and the hardness of the core part is set to be within ±HRC5. When the hardness of the raceway surface is less than HRC60, sufficient durability is not obtained. As the difference between the hardness of the raceway surface and the hardness of the core part is set to be within ±HRC5, a difference in residual stress between the surface part and the core part is reduced. Tensile stress acts on the surface part, and compressive stress acts on the core part. However, as the difference in residual stress between the surface part and the core part is reduced, a fracture and a rolling fatigue failure can be suppressed.

The aforementioned C content is also a proper value for setting the difference between the hardness of the raceway surface and the hardness of the core part to be within ±HRC5.

It is preferred that the material of the ball uses Fe as a parent material, and contains 0.3 to 0.7 mass % C, 0.2 to 1.0 mass % Mn, 0.2 to 1.2 mass % Si, 0.1 to 0.3 mass % Mo, and 0.1 to 1.0 mass % V. C, Mn, Si, and Mo are alloy components preferred as the aforementioned materials of the inner ring and the outer ring. Each of C, Mn, Si, and Mo produces the same effect, C can form carbide to improve wear resistance, Mn and Si improve hardenability and hardness, and Mo improves hardenability and toughness. V can form carbide to strengthen a parent material, and suppress a reduction in hardness even in a high-temperature use environment.

Hardness of the surface of the ball is preferably set to HRC55 to 60. Along with a composition of the material described above, the surface is set to the hardness of this range. Thereby, early damage to the outer ring and the inner ring can be prevented without damaging a function (of supporting a load) as the bearing.

The bearing fitted into the drill part of the drilling rig has a use environment of a poor lubricated state, and is easily damaged by wear. For this reason, an early failure of the drill bit is prevented by replacing the bearing at fixed periods, but maintenance expenses associated with the replacement of the bearing are huge. Especially, since replacement costs of the races 2 and 3 are huge compared to the balls 4, there is a need to reduce the wear of the races 2 and 3 as far as possible. For this reason, in the present bearing 1, the hardness of the surfaces of the balls 4 is smaller than that of the raceway surfaces 10 and 11 of the inner rings 2a to 2j and the outer rings 3a to 3j, and thereby wear of the raceway surfaces 10 and 11 is suppressed. Ease of the wear is generally determined by a magnitude of the hardness. Thus, in the present bearing 1, the surfaces of the balls which have low hardness are worn first, and the wear of the raceway surfaces 10 and 11 of the inner rings 2a to 2j and the outer rings 3a to 3j is suppressed. When the balls 4 are worn to some extent, only the balls 4 may be replaced, and expenses can be suppressed compared to replacing the entire bearing. Further, the balls are set to the composition of the material described above, and thereby have the hardness, the toughness, and the wear resistance to some extent, and thus even when the wear proceeds, the balls 4 can be used without damaging the function as the rolling elements.

In the present embodiment, when roughness of the raceway surfaces 10 and 11 of the inner rings 2a to 2j and the outer rings 3a to 3j is defined as Se and Si, and surface roughness of the ball 4 is defined as Sb, Se, Si, and Sb have a relation of 0.05 μm Ra≤Se, a relation of Si≤0.60 μm Ra, a relation of 0.005 μm Ra≤Sb≤0.100 μm Ra, and a relation of Se and Si≥Sb. That is, the surface roughness of the ball 4 is made to be better than those of the races 2 and 3, and thereby the races 2 and 3 are inhibited from being worn prior to the ball 4, so that the maintenance costs of the races 2 and 3 can be reduced. When the surface roughness is increased, the wear of the inner and outer ring raceway surfaces 10 and 11 and the wear of the surfaces of the balls 4 proceed easily. Thus, if Se and Si have the above ranges, this is effective for wear reduction in the use environment of the present application. The lower limit of the roughness is not good to be reduced without limitation, and is determined from restriction on working.

The relation between the raceway surface roughness and the ball surface roughness is set to Se and Si≥Sb. However, when two members are generally brought into contact, it is known that the member having good roughness tends to be more easily worn than the member having poor roughness. The roughness of the balls 4 is improved, and thereby the balls 4 do not accelerate the wear of the races 2 and 3. As a result, the wear of the races 2 and 3 can be reduced. Meanwhile, the ball 4 is worn prior to the races 2 and 3. However, when the balls 4 are given a trial for a fixed time and are worn to some extent, if only the balls 4 are replaced, the maintenance costs can be reduced compared to replacing the races 2 and 3.

In this way, the present bearing 1 has a long lifespan in spite of use at the high temperature, in the poor lubrication environment, and in the harsh environment in which the foreign materials are mixed. The present bearing is suitable as the bearing 120 that supports the drill bit 110 of the drill part 100, and is also suitable for a drill bit that is used in a drilling rig such as a mud motor or a downhole motor. In addition to this, the present bearing 1 may be used as a bearing that is fitted into a digger or the like used at a mine or an oil field.

Further, in the multi-row ball bearing of the present invention, the outer ring and the inner ring may be the division races that are divided on at least one raceway surface at the middle position of the raceway surface.

Figure 6:
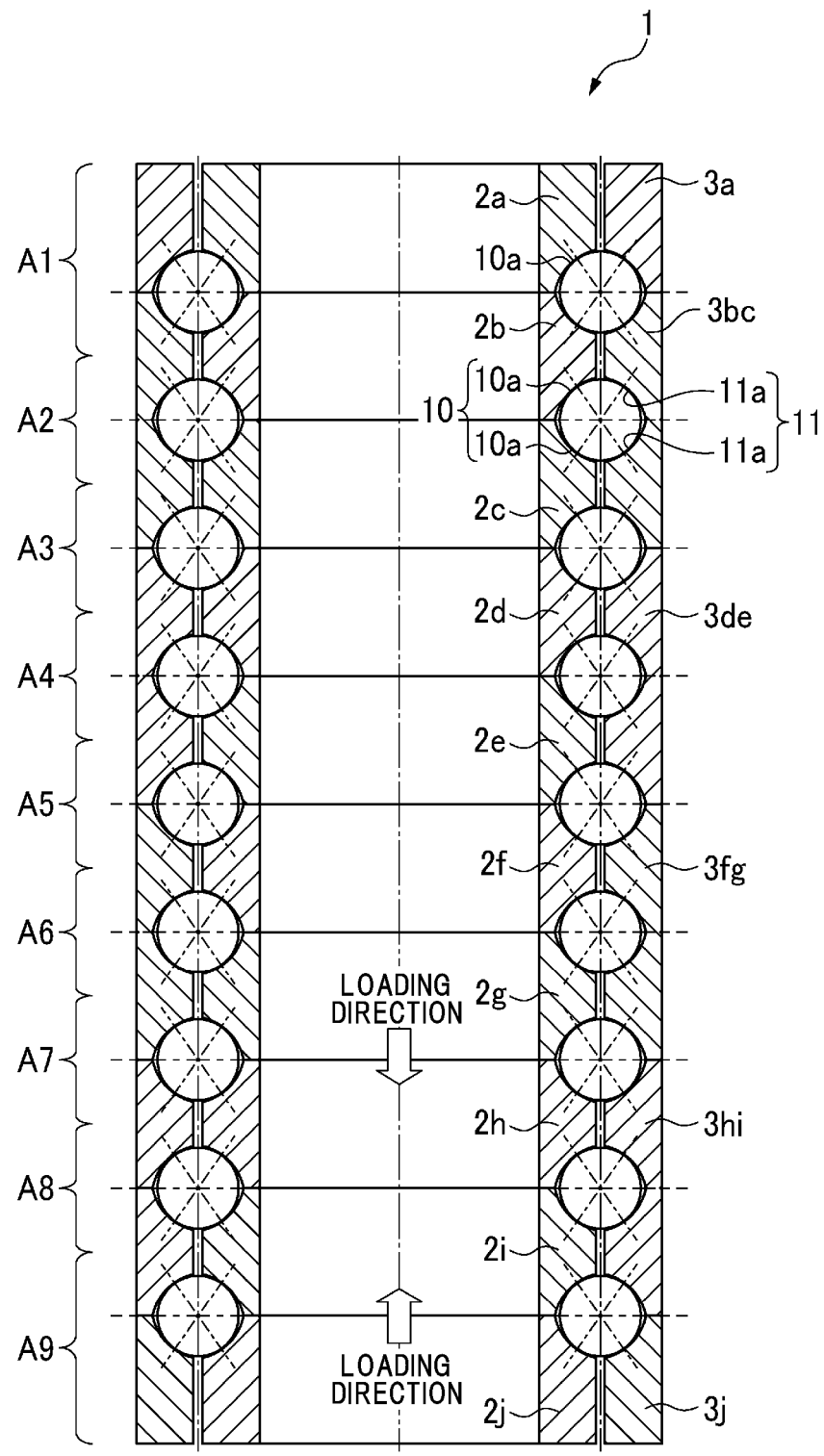
FIG. 6 is a sectional view illustrating a multi-row ball bearing according to a first modification of the present invention.

For example, as in a first modification illustrated in FIG. 6, outer and inner rings may be division races in which only some of the outer rings 3 are divided at the middle positions of outer ring raceway surfaces 11 in an axial direction. In this case, the outer rings 3 are divided at the middle positions of the outer ring raceway surfaces 11 of bearing units A1, A3, A5, A7, and A9 in the axial direction, whereas the outer ring raceway surfaces 11 of bearing units A2, A4, A6, and A8 are constituted of individual outer rings 3bc, 3de, 3fg, and 3hi. That is, each of the individual outer rings 3bc, 3de, 3fg, and 3hi has four outer ring raceway surfaces that have both outer ring raceway surfaces 11a and 11a of one bearing unit, an outer ring raceway surface 11a of one of bearing units adjacent to the bearing unit, and an outer ring raceway surface 11a of the other bearing unit adjacent to the bearing unit.

Figure 7:
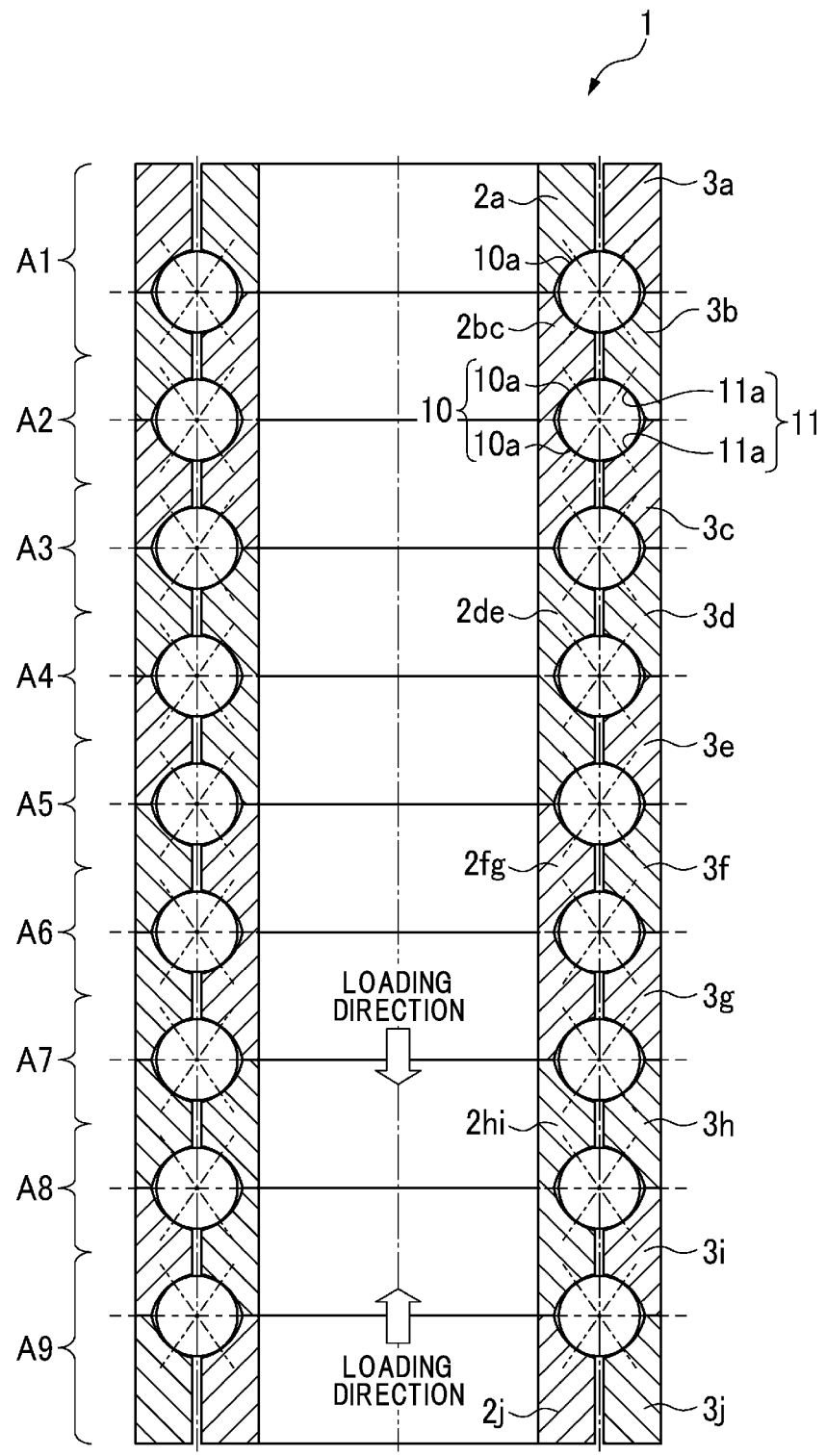
FIG. 7 is a sectional view illustrating a multi-row ball bearing according to a second modification of the present invention.

As in a second modification illustrated in FIG. 7, outer and inner rings may be division races in which only some of the inner rings 2 are divided at the middle positions of inner ring raceway surfaces 10 in an axial direction. In this case, the inner rings 2 are divided at the middle positions of the inner ring raceway surfaces 10 of bearing units A1, A3, A5, A7, and A9 in the axial direction, whereas the inner ring raceway surfaces 10 of the bearing units A2, A4, A6, and A8 are constituted of individual inner rings 2bc, 2de, 2fg, and 2hi. That is, each of the individual inner rings 2bc, 2de, 2fg, and 2hi has four inner ring raceway surfaces that have both inner ring raceway surfaces 10a and 10a of one bearing unit, an inner ring raceway surface 10a of one of bearing units adjacent to the bearing unit, and an inner ring raceway surface 10a of the other bearing unit adjacent to the bearing unit.

Figure 8:
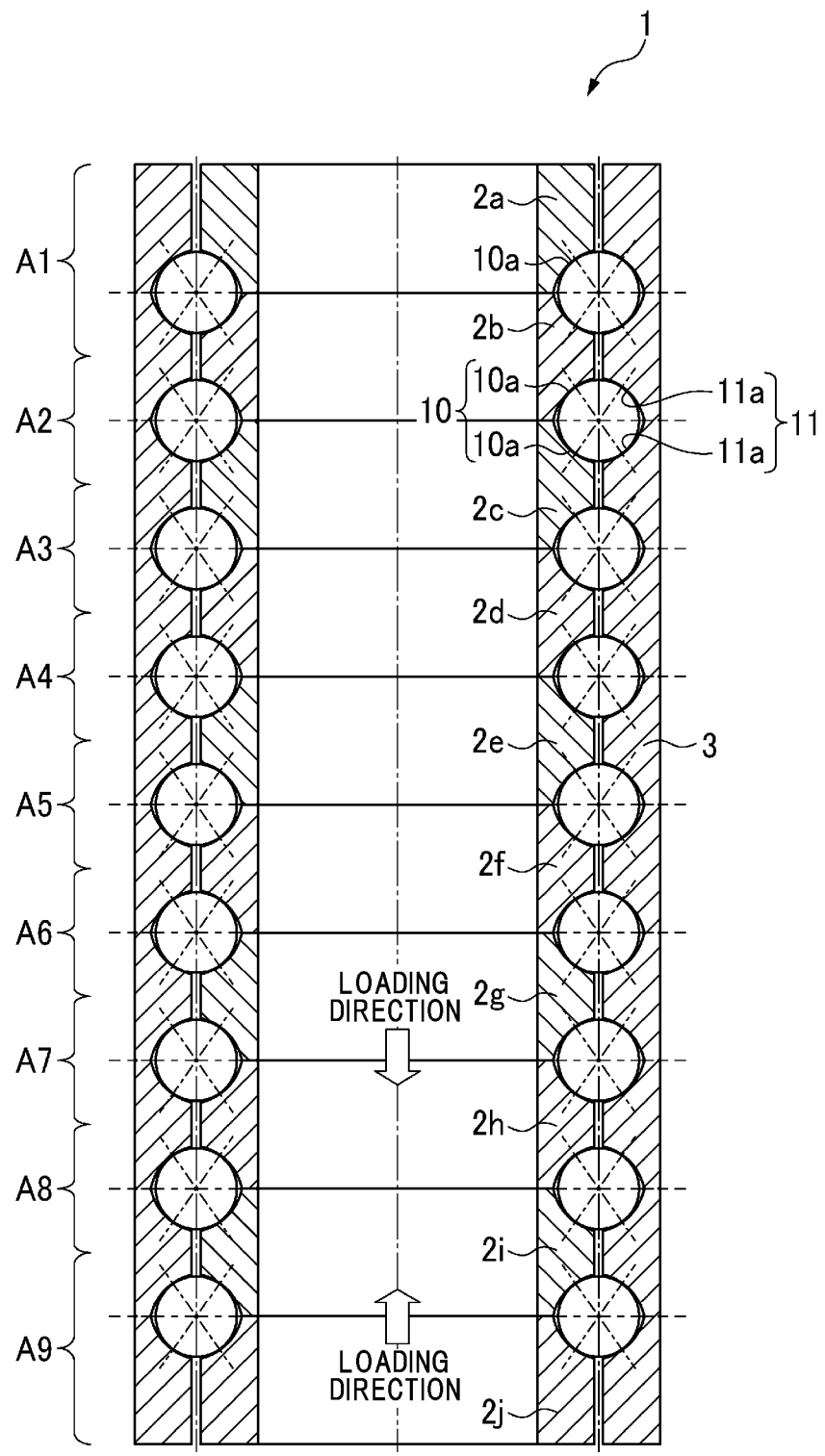
FIG. 8 is a sectional view illustrating a multi-row ball bearing according to a third modification of the present invention.

Further, only the inner rings 2 may be the division races that are divided at the middle positions of the inner ring raceway surfaces 10 in the axial direction. For example, as in a third modification illustrated in FIG. 8, outer rings 3 may be individual races that are not divided in all bearing units A1 to A8.

Figure 9:
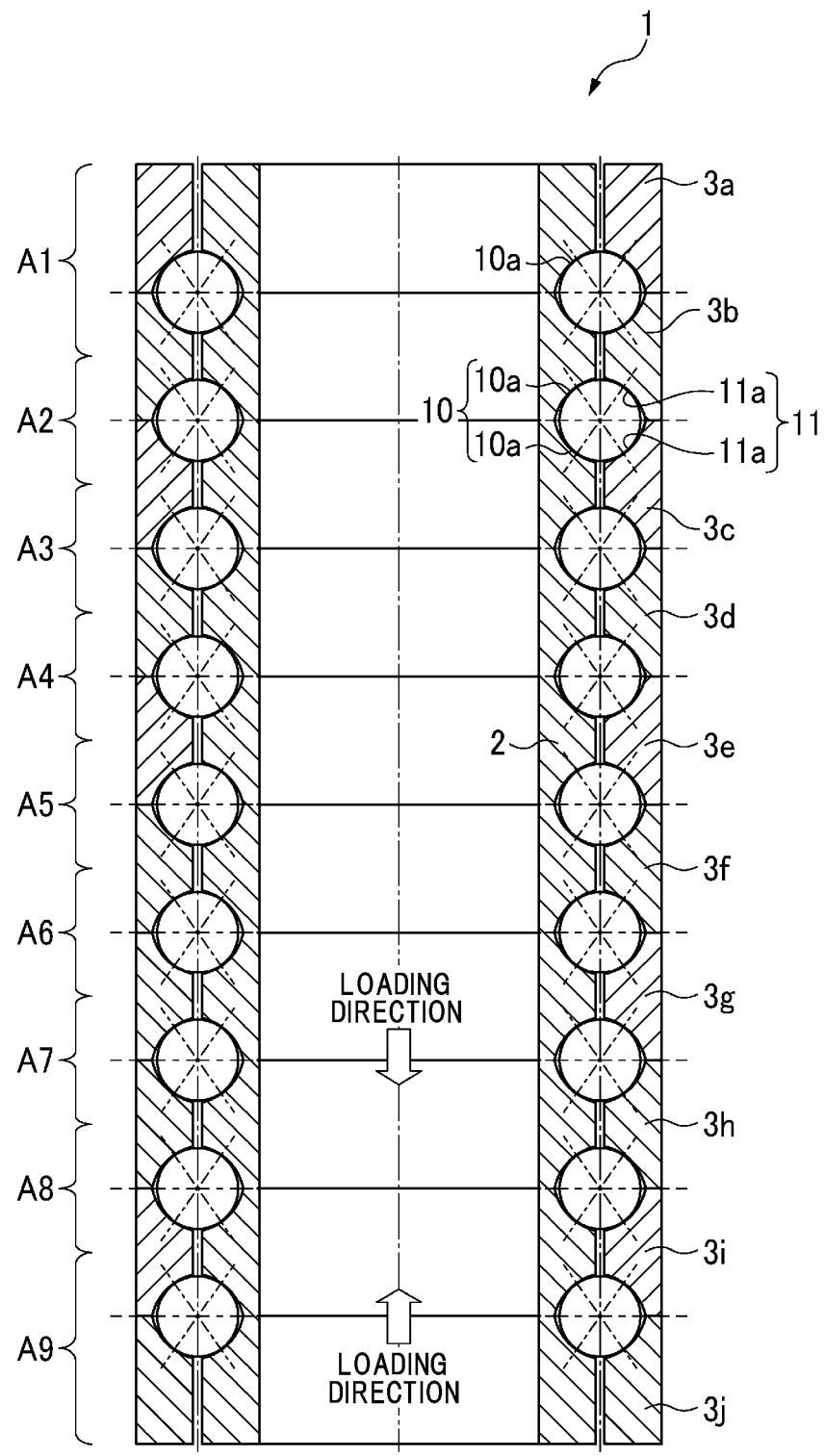
FIG. 9 is a sectional view illustrating a multi-row ball bearing according to a fourth modification of the present invention.
Figure 10:
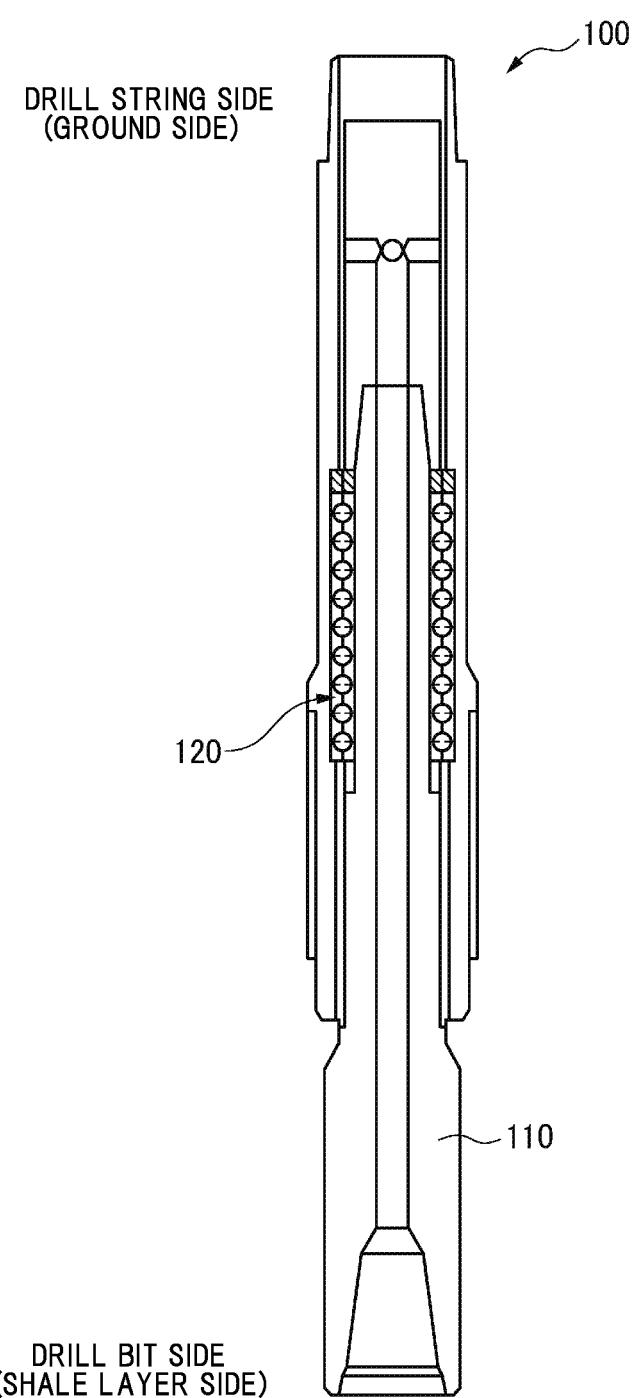
FIG. 10 is a sectional view illustrating an example of a drill part of a drilling rig.

Likewise, only the outer rings 3 may be the division races that are divided at the middle positions of the outer ring raceway surfaces 11 in the axial direction. For example, as in a fourth modification illustrated in FIG. 9, inner rings 2 may be individual races that are not divided in all bearing units A1 to A8.

In the present embodiment, the case in which the ball 4 and the inner and outer ring raceway surfaces are in contact at four points in the unit bearing has been described. However, without being limited thereto, the ball 4 and the inner and outer ring raceway surfaces may be in contact at three points, two of which are in contact with one of the raceway surfaces, and one of which is in contact with the other raceway surface.

This application is based on Japanese Patent Application No. 2015-223210 filed on Nov. 13, 2015, and Japanese Patent Application No. 2016-038899 filed on Mar. 1, 2016, the contents of which are incorporated herein by reference.

DESCRIPTION OF REFERENCE NUMERALS AND SIGNS

1: Multi-row ball bearing
2a to 2j: Inner ring
3a to 3j: Outer ring
4: Ball
10: Inner ring raceway surface
11: Outer ring raceway surface
100: Drill part
110: Drill bit
120: Bearing

The invention claimed is:

1. A multi-row ball bearing comprising an outer ring, an inner ring, and two or more rows of balls retained by raceway surfaces of the outer and inner rings, wherein:
   each of the raceway surfaces is formed as a Gothic arch groove;
   the outer and inner rings are division races that are divided on at least one of the raceway surfaces at a middle position of the raceway surface; and
   when roughness of the raceway surfaces of the outer and inner rings is defined as Se and Si, and surface roughness of the ball is defined as Sb, the multi-row ball bearing has a relation of 0.05 μm Ra≤Se, a relation of Si≤0.60 μm Ra, a relation of 0.005 μm Ra≤Sb≤0.100 μm Ra, and a relation of Se and Si≥Sb.

2. The multi-row ball bearing according to claim 1, wherein each of the balls and the raceway surfaces are in contact at four points.

3. The multi-row ball bearing according to claim 1, wherein the multi-row ball bearing is a full type ball bearing without a retainer.

4. The multi-row ball bearing according to claim 1, wherein the outer and inner rings are formed of alloy steel that uses Fe as a parent material and contains 0.3 to 0.7 mass % C, 0.2 to 1.2 mass % Si, 0.2 to 1.7 mass % Mn, 0.2 to 1.3 mass % Cr, 0.1 to 0.3 mass % Mo, and 0.1 to 1.0 mass % Ni, an amount of residual austenite of the raceway surface is 25 to 45 vol %, and a concentration of (C+N) is 0.75 to 1.1 mass %.

5. The multi-row ball bearing according to claim 1, wherein hardness of the raceway surfaces of the outer and inner rings is HRC60 to HRC65, and a difference between the hardness of the raceway surface and a core part is within ±HRC5.

6. The multi-row ball bearing according to claim 1, wherein the balls are formed of alloy steel that uses Fe as a parent material and contains 0.3 to 0.7 mass % C, 0.2 to 1.0 mass % Mn, 0.2 to 1.2 mass % Si, 0.1 to 0.3 mass % Mo, and 0.1 to 1.0 mass % V.

7. The multi-row ball bearing according to claim 1, wherein surface hardness of the ball is HRC55 to 60.

8. The multi-row ball bearing according to claim 1, wherein, when a diameter of the ball is defined as Dw, and radii of race grooves of the outer and inner rings are defined as Re and Ri, the multi-row ball bearing has a relation of 0.54≤Re/Dw and a relation of Ri/Dw≤0.75.

9. The multi-row ball bearing according to claim 1, wherein, when a diameter of the ball is defined as Dw, and a height of a cross section of the bearing is defined as H, the multi-row ball bearing has a relation of 0.55≤Dw/H≤0.75.

10. The multi-row ball bearing according to claim 1, wherein, when a height of a cross section of the bearing is defined as H, a height of a cross section of the outer ring is defined as A, and a height of a cross section of the inner ring is defined as B, the multi-row ball bearing satisfies a relation of 0.20≤A/H≤0.50 and a relation of 0.20≤B/H≤0.50.

11. The multi-row ball bearing according to claim 10, wherein, when the height of the cross section of the outer ring is defined as A, and the height of the cross section of the inner ring is defined as B, the multi-row ball bearing satisfies a relation of A<B or a relation of A>B.

12. The multi-row ball bearing according to claim 1, wherein the multi-row ball bearing is an open type bearing in which muddy water flows through an inside of the bearing.

13. The multi-row ball bearing according to claim 1, wherein the multi-row ball bearing is used in a drill for a drilling rig, a mud motor, or a downhole motor.

14. A multi-row ball bearing comprising an outer ring having two or more rows of raceway surfaces, an inner ring having two or more rows of raceway surfaces, and two or more rows of balls retained by the raceway surfaces of the outer and inner rings, wherein:
  each of the raceway surfaces is formed as a Gothic arch groove;
  each of the balls and the raceway surfaces are in contact at four points;
  the outer and inner rings are division races that are divided on at least one of the raceway surfaces at a middle position of the raceway surface; and
  when roughness of the raceway surfaces of the outer and inner rings is defined as Se and Si, and surface roughness of the ball is defined as Sb, the multi-row ball bearing has a relation of 0.05 μm Ra≤Se, a relation of Si≤0.60 μm Ra, a relation of 0.005 μm Ra≤Sb≤0.100 μm Ra, and a relation of Se and Si≥Sb.

* * * * *